United States Patent [19]
Suwashita

[11] Patent Number: 5,155,783
[45] Date of Patent: Oct. 13, 1992

[54] INSTALLATION OF AN OPTICAL COMPONENT IN AN OPTICAL DEVICE

[75] Inventor: Masakuni Suwashita, Tokyo, Japan

[73] Assignee: Asahi Kogaku Kogyo Kabushiki Kaisha, Tokyo, Japan

[21] Appl. No.: 810,116

[22] Filed: Dec. 19, 1991

[30] Foreign Application Priority Data

Dec. 19, 1990 [JP] Japan .............. 2-404003[U]

[51] Int. Cl.⁵ .................................. G02B 7/00
[52] U.S. Cl. ................................ 385/88; 385/92
[58] Field of Search ........................ 385/88-94; 361/380, 392, 393, 394, 417; 359/900; 250/234, 235

[56] References Cited

U.S. PATENT DOCUMENTS

| | | | |
|---|---|---|---|
| 4,840,450 | 6/1989 | Jones et al. | 385/90 |
| 4,868,673 | 9/1989 | Negoro | 385/296 |
| 4,918,306 | 4/1990 | Saito | 250/235 |
| 5,011,247 | 4/1991 | Boudreau et al. | 385/88 |

Primary Examiner—Frank Gonzalez
Assistant Examiner—John Ngo
Attorney, Agent, or Firm—Sandler, Greenblum & Bernstein

[57] ABSTRACT

An installation structure is provided for an optical component, such as a collimator unit, with a control circuit board in an optical device, such as a laser scanning device. A L-shaped regulating plate is integrated to the collimator unit and the collimator unit is separated into an inside part and an outside part by the vertical wall plate portion of the L-shaped regulating plate. The vertical wall plate portion is abutted to the inner surface of the wall portion of a housing of the laser scanning device while the horizontal plate portion of the L-shaped regulating plate is seated on the flat bottom surface of a receiving recess formed on the bottom plate of the housing. A cut portion is provided on the wall portion of the housing, through which the outside part of the collimator unit is protruded out of the housing. The control circuit board is secured to the outside part of the collimator unit. The clearance between the cut portion and the outer periphery of the outside part of the collimator unit is closed by the rear surface of the vertical wall plate portion of the L-shaped regulating plate.

8 Claims, 3 Drawing Sheets

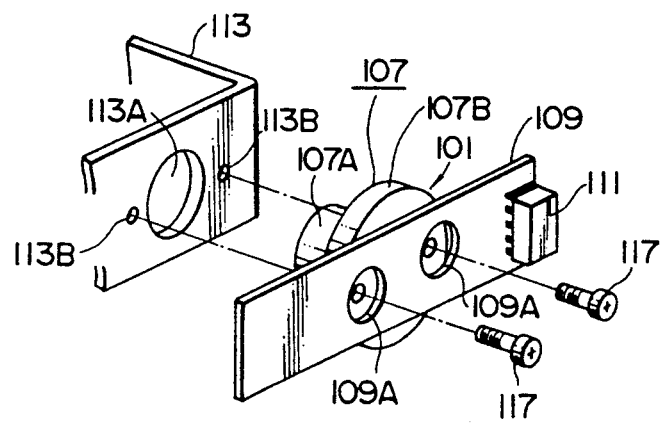
FIG. I
PRIOR ART
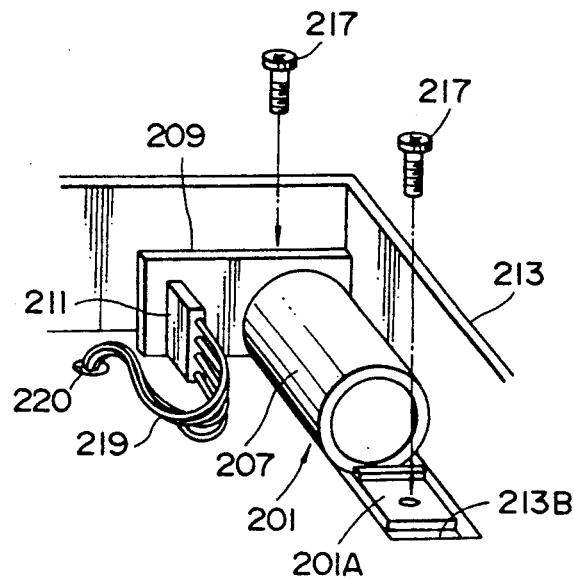
FIG. 2
PRIOR ART

INSTALLATION OF AN OPTICAL COMPONENT IN AN OPTICAL DEVICE

BACKGROUND OF THE INVENTION

The present invention relates to the installation of an optical component in an optical device, and more particularly to a structure for installing an optical component which should be installed inside a housing of an optical device, but should be connected to an external part arranged outside the housing.

In the prior art, a known optical component of this type is a collimator unit mounted in a light scanning device to be employed in, for instance, a laser beam printer.

Usually, the collimator unit comprises a light emitting source such as a semi-conductor laser, a collimator lens for converting the light emitted from the light emitting source to a parallel flux, a casing for accommodating the light emitting source and the collimator lens, and a circuit board for controlling the light emitting source. A connector is to be provided to the circuit board for receiving control external signals.

One example of a conventional installation structure for a collimator unit is as illustrated in FIG. 1. In FIG. 1, a small-diametered front portion 107A of a casing 107 of a collimator unit 101 is inserted into a housing 113 through a through-hole 113A formed thereon, and is fixed thereto by a pair of screws 117, 117 which are inserted into the screw holes 113B, 113B formed on the housing 113 through the rear flange portion 107B of the casing 107. A connector 111 is mounted on a circuit board 109 secured to the back surface of the casing 107 formed with a pair of holes 109A, 109A for passing the screws 117, 117 therethrough, respectively.

With this prior installation structure, however, the collimator unit 101 must first be abutted to the housing 113 from external side and then fixed thereto by threading the screws 117, 117 while maintaining the optical axis of the collimator unit 101 coincident with those of other optical components to also be arranged inside the housing 113. Accordingly, it is not easy to leave the fitting thereof to an automatic assembling system with assuring to seat the collimator unit 101 with high positional accuracy.

Another example of the conventional installation structure is as illustrated in FIG. 2. In FIG. 2, a casing 207 as well as the control circuit board 209 are installed inside the housing 213. More particularly, the collimator unit 201 is provided with the bottom plate portion 201A extended along the optical axis of the collimator unit 201, while a receiving recess 213b is formed on the bottom portion of the housing 213 for receiving the bottom plate portion 201A thereinto and to be fixed thereto by the pair of screws 217, 217.

With this prior art installation structure, however, a harness 219 of a connector 211 or the like must be passed through the bottom portion of the housing 213 to be connected to an external part, where a sealing material 220 or the like should be applied, which is troublesome and makes it difficult to have installation of the collimator unit 201 performed by automatic assembling system.

SUMMARY OF THE INVENTION

It is therefore an object of the present invention to provide an improved installation structure of an optical component such as a collimator unit in an optical device such as a laser scanning device, capable of leaving installation work to an automatic assembling system with assuring high positioning accuracy.

For the above purpose, according to the present invention, there is provided an installation structure of an optical component in an optical device. The optical device is provided with a housing for mounting thereon the optical component that is adapted to be connected to outside of the housing.

The optical component is provided with a horizontal reference portion extending in the direction parallel to the optical axis of the optical component, and a vertical reference portion extending in the direction crossing to the optical axis, the optical component being separated into an inside part and an outside part by the vertical reference portion.

The housing is provided with a first reference surface at its bottom plate portion and a second reference surface at its wall plate portion. The horizontal reference portion is adapted to be abutted to the first reference surface while the vertical reference portion should be abutted to the second reference surface, whereby the optical component is seated at its predetermined position with its pressure being regulated as predetermined.

Accordingly, the wall plate portion of the housing including the second reference surface is partly cut with the upper side open. The cut portion is formed in such a fashion that the outside part of the optical component is protruded out of the cut portion but the clearance between the cut portion and the outer circumferential surface of the outside part of the optical component is closed by the vertical reference portion of the optical component when the vertical reference portion is abutted to the second reference surface.

In case the optical component is a collimator unit with a control circuit board, the installation structure may be structured such that the control circuit board is connected to the outside part of the collimator unit so that the control circuit board is placed outside the housing when the collimator unit is installed in the optical device.

DESCRIPTION OF THE ACCOMPANYING DRAWINGS

FIG. 1 is an exploded perspective view showing an example of a conventional installation structure of a collimator unit to an optical unit;

FIG. 2 is a perspective view of another example of a conventional installation structure;

DESCRIPTION OF THE EMBODIMENT

Hereinafter, the embodiment of the present invention is explained in detail by referring to the accompanying drawings.

Figure 3:
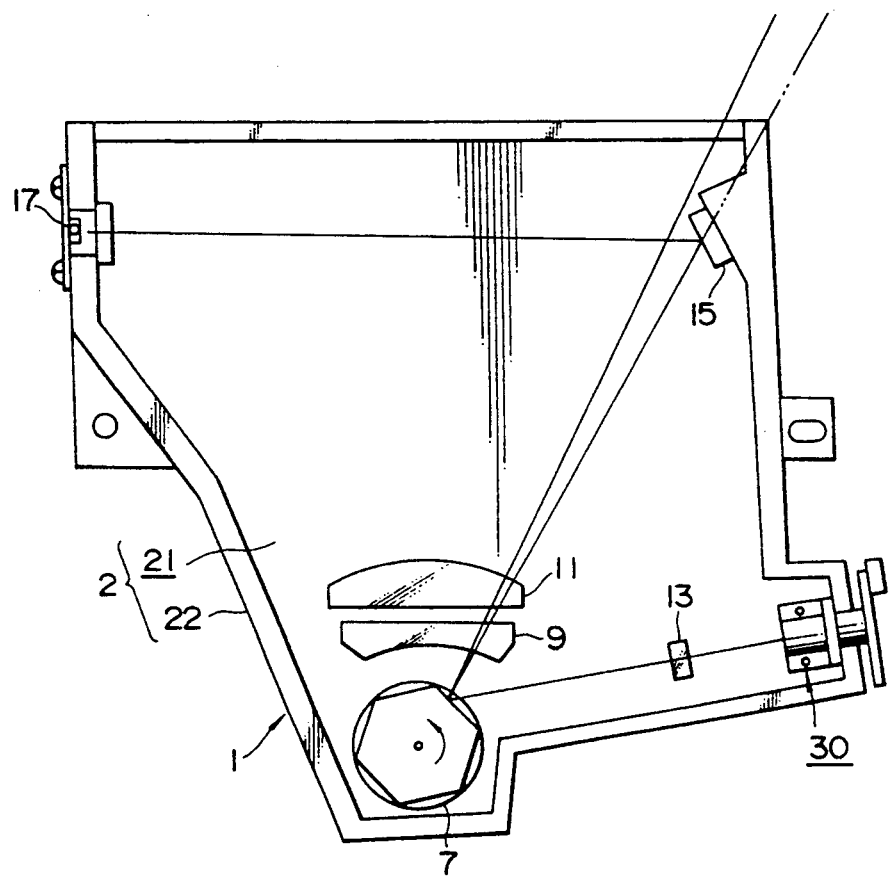
FIG. 3 is a plan view of a laser scanning unit in which a collimator unit is installed in a manner embodying the invention.
Figure 4:
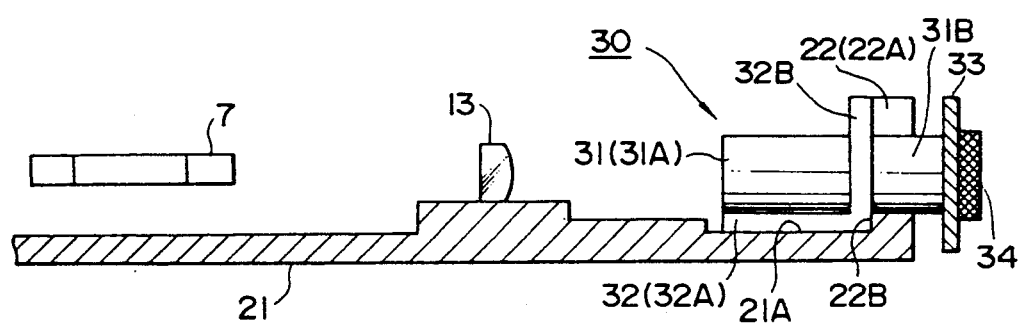
FIG. 4 is a side view showing the installation structure of the collimator unit shown in FIG. 3.

FIG. 3 is a plan view showing an essential portion of a laser beam scanning device employed, for example, in a laser printer.

The illustrated laser beam scanning device 1 comprises a housing 2 constituted by a bottom plate 21 and a housing wall 22 surrounding the bottom plate 21, and various optical components mounted thereon. The mounted optical components are a collimator unit 30 accommodating a laser source (not shown) and a collimator lens (not shown) therein for emitting a laser beam carrying optical image information, a light deflection means 7 for deflecting the emitted laser beam, an $f\theta$ lenses 9 and 11 for making a scanning speed of the laser beam constant on an image-forming surface, a compensation lens 13 for compensating tilt of the light deflection means 7, a reflecting mirror 15 for reflecting the laser beam, and a horizontal-sync signal generating unit 17 for generating and outputting horizontal-sync signal, which regulates the timing of beam modulation in the laser source, when the beam reflected by the reflection mirror 15 is incident thereon.

The collimator unit 30 comprises a cylindrical casing 31 which is separated in to a front part 31A and a rear part 31B by a substantially L-shaped regulating plate 32 which is integrated to the casing 31.

The front part 31A of the casing 31 is mounted on and integrated to the horizontal plate portion 32A of the L-shaped regulating plate 32, while the rear part 31B of the casing 31 is backwardly protruded out of the vertical wall portion 32B of the L-shaped regulating plate 32.

A circuit board 33 for laser control is secured to the rear part 31B of the casing 31, wherein a semiconductor laser (not shown) is accommodated, and a connector 34 is fixed to the circuit board 33.

On the bottom plate 21 of the housing 2, a receiving recess 21A is formed at the location where the collimator unit 30 should be placed. The receiving recess 21A has a square figure corresponding to the shape of the horizontal plate portion 32A of the L-shaped regulating plate 32. The flat bottom surface of the receiving recess 21A is formed as a horizontal reference surface for regulating the vertical posture of the collimator unit 30 in cooperation with the lower surface of the horizontal plate portion 32A of the L-shaped regulating plate 32.

Figure 5:
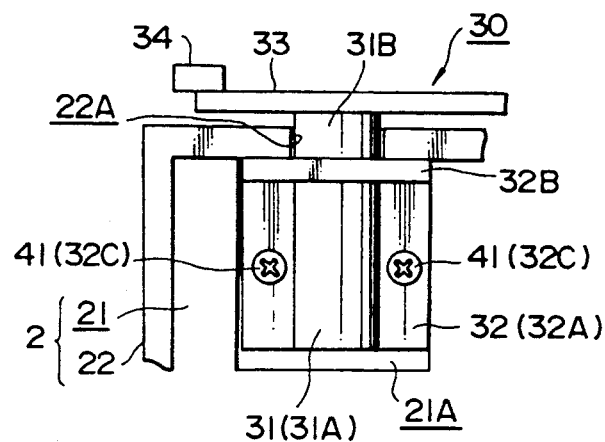
FIG. 5 is a plan view showing the installation structure of the collimator unit shown in FIG. 3.
Figure 6:
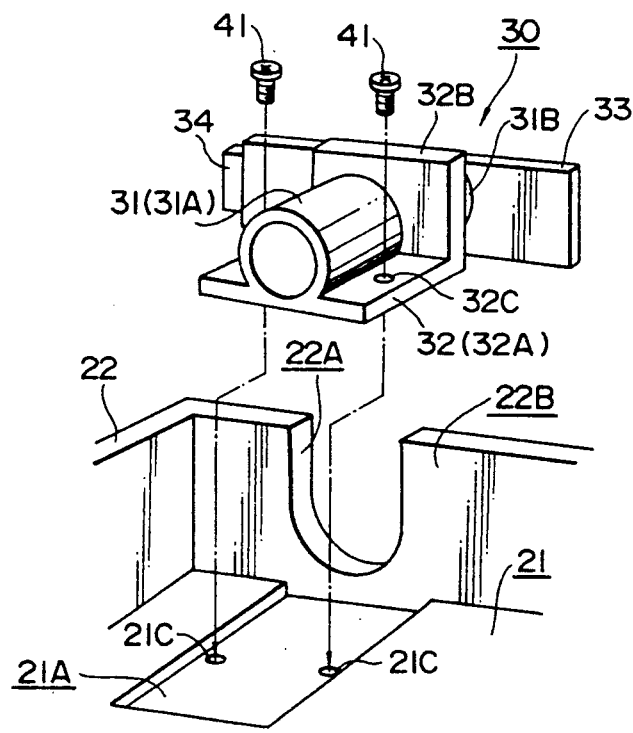
FIG. 6 is an exploded perspective view showing the installation structure of the collimator unit shown in FIG. 3.

One of the inner side surfaces of the receiving recess 21A (in this embodiment, the right-hand side one in FIG. 5) is formed as a lateral reference surface for regulating the lateral posture of the collimator unit 30 in the direction horizontally crossing the optical axis thereof in cooperation with the corresponding one of side surfaces of the horizontal plate portion 32A of the L-shaped regulating plate 32.

On the housing wall 22, a U-shaped cut portion 22A is formed to receive the rear part 31B of the casing 31. The inner surface of the housing wall 22 including the U-shaped cut portion 22A is formed as a vertical reference surface for regulating the horizontal posture of the collimator unit 30 in the axial direction thereof in cooperation with the rear surface of the vertical wall portion 32B of the L-shaped regulating plate 32.

The collimator unit 30 is installed on the housing 2 as follows:

First, the horizontal plate portion 32A of the L-shaped regulating plate 32 of the collimator unit 30 is seated on the horizontal reference surface of the housing 2, i.e., the flat bottom surface of the receiving recess 21A while seating the rear part 31B of the casing 31 on the U-shaped cut portion 22A with the circuit board 33 and the connector 34 remaining outside of the housing 2.

Then, the rear surface of the vertical wall portion 32B of the L-shaped regulating plate 32 is abutted to the vertical reference surface of the housing 2, i.e., the inner surface of the housing wall 22B. Under this state, a pair of fastening screws 41, 41 are threaded into screw holes 21C, 21C formed at the bottom plate of the receiving recess 21A through screw holes 32C, 32C of the horizontal plate portion 32A of the L-shaped regulating plate 32 to secure the collimator unit 30 onto the housing 2.

With the installation structure as above described, as the installation work comprises only three steps; i.e., 1) seating the collimator unit 30 in the receiving recess 21A. 2) abutting the rear surface of the vertical wall portion 32B of the L-shaped regulating plate 32 of the collimator unit 30 to the inner surface of the housing wall 22A, and 3) securing the collimator unit 30 to the housing 2 by threading the screws 41, 41 thereonto, it can be left to the automatic assembling system while assuring the high positional accuracy.

Further, by abutting one of the side surfaces of the horizontal plate portion 32A of the L-shaped regulating plate 32 to one of the inner side surfaces of the receiving recess 21A simultaneously with execution of the above 2) step, more accurate positioning of the collimator unit 30 can be obtained.

Moreover, as the control circuit board 33 is positioned outside the housing 2, electrical work such as connecting the harness and so on to the connector 34 can be easily done.

Furthermore, as the vertical wall portion 32B of the L-shaped regulating plate 32 is abutted to the housing wall 22, thus closing the clearance between the U-shaped cut portion 22A and the outer circumferential surface of the rear part 31B of the casing 31 of the collimator unit 30, invasion by dust and so on can be prevented without applying the sealing material and so onto the clearance therebetween.

It should be noted that the present disclosure relates to subject matter contained in Japanese Utility Model Application No. HEI 2-404003 filed on Dec. 19, 1990, which is expressly incorporated herein by reference in its entirety.

What is claimed is:

1. An installation structure of an optical component for use in an optical device, said optical device being provided with a housing for mounting thereon said optical component, said optical component being adapted to connect to said housing;

wherein said optical component is provided with a horizontal reference portion extending in a direction parallel to the optical axis of said optical component, and a vertical reference portion extending in a direction crossing said optical axis, said optical component being separated into an inside part and an outside part by said vertical reference portion;

wherein said housing is provided with a first reference surface at a bottom plate portion and a second reference surface at a wall plate portion, said horizontal reference portion being adapted to abut said first reference surface and said vertical reference portion being adapted to abut said second reference surface, wherein said optical component is seated at a predetermined position with its posture being regulated as predetermined; and wherein said wall plate portion of said housing including said second reference surface is partly cut with the upper side open, said cut portion being formed such that said outside part of said optical component is protruded out of said cut portion but the clearance between said cut portion and the outer circumferential surface of said outside part of said optical component is closed by said vertical reference portion of said optical component when said vertical reference portion is abutted to said second reference surface.

2. The installation structure according to claim 1, wherein said optical component comprises a collimator unit with a control circuit board, said control circuit board being connected to said outside part of said collimator unit so that said control circuit board is placed outside said housing when said collimator unit is installed in said optical device.

3. The installation structure according to claim 1, wherein said optical component comprises a main body and a substantially L-shaped regulating plate integrated to said main body, a horizontal plate portion of said L-shaped regulating plate comprising said horizontal reference portion and a vertical plate portion of said L-shaped regulating plate comprises said vertical reference portion.

4. The installation structure according to claim 3, wherein said housing is provided with a receiving recess formed on said bottom plate thereof, said receiving recess being formed to have a configuration corresponding to that of said horizontal plate portion of the L-shaped regulating plate for receiving the latter thereinto, the bottom flat surface of said receiving recess being formed as said first reference surface.

5. The installation structure according to claim 4, wherein a connector is fixed to said circuit board so as to be connected to an externally arranged component.

6. The installation structure according to claim 1, wherein said optical component is further provided with a lateral reference portion extending in a direction crossing both said horizontal and vertical reference portions; and said housing is further provided with a third reference surface at the bottom plate portion, to which said lateral reference portion is abutted so as to further regulate the position of said optical component seated on said housing of said optical device.

7. The installation structure according to claim 6, wherein said optical component comprises a main body and a substantially L-shaped regulating plate integrated to said main body, a horizontal plate portion of said L-shaped regulating plate comprising said horizontal reference portion and said lateral reference portion, and a vertical plate portion of said L-shaped regulating plate comprises said vertical reference portion.

8. The installation structure according to claim 7, wherein said housing is provided with a receiving recess formed on the bottom plate thereof, said receiving recess being formed to have a configuration corresponding to that of said horizontal plate portion of said L-shaped regulating plate for receiving the latter thereinto, the bottom flat surface of said receiving recess being formed as said first reference surface, while one of the inner side surfaces of said receiving recess is formed as said third reference surface.

* * * * *